(12) United States Patent
Lee (10) Patent No.: US 11,524,227 B1
(45) Date of Patent: Dec. 13, 2022

(54) WIRELESS HEADPHONE CONTROLLER

(71) Applicant: Andrew Lee, Driftwood, TX (US)

(72) Inventor: Andrew Lee, Driftwood, TX (US)

( * ) Notice: Subject to any disclaimer, the term of this patent is extended or adjusted under 35 U.S.C. 154(b) by 14 days.

(21) Appl. No.: 17/220,191

(22) Filed: Apr. 1, 2021

Related U.S. Application Data (60) Provisional application No. 63/003,396, filed on Apr. 1, 2020.

(51) Int. Cl.
*A63F 13/24* (2014.01)
*A63F 13/25* (2014.01)

(52) U.S. Cl.
CPC .............. *A63F 13/24* (2014.09); *A63F 13/25* (2014.09)

(58) Field of Classification Search
None
See application file for complete search history.

(56) References Cited

U.S. PATENT DOCUMENTS

| | | | |
|---|---|---|---|
| 8,409,002 B2 | 4/2013 | Evans et al. | |
| 8,529,356 B2 | 9/2013 | Soelberg et al. | |
| 10,143,921 B1 | 12/2018 | Strahle | |
| 10,191,714 B2 | 1/2019 | Wiggemans et al. | |
| 10,335,674 B1 | 7/2019 | Trenado et al. | |
| 11,290,580 B2 * | 3/2022 | Kumar | H04R 1/105 |
| 2004/0224763 A1 * | 11/2004 | Lum | G06F 3/0233 463/36 |
| 2018/0207523 A1 * | 7/2018 | Lyden | A63F 13/214 |
| 2018/0262826 A1 * | 9/2018 | Ingram | H04B 1/3883 |
| 2021/0162297 A1 * | 6/2021 | Stemple | H04B 1/02 |

OTHER PUBLICATIONS

Stadia Controller Product Listing [online] Google Store [retrieved on Jan. 3, 2020]. Retrieved from the Internet: <URL: https://store.google.com/us/product/stadia_controller>.

* cited by examiner

*Primary Examiner* — James S. McClellan
*Assistant Examiner* — Peter J Iannuzzi
(74) *Attorney, Agent, or Firm* — Cramer Patent & Design, PLLC; Aaron R. Cramer (57) ABSTRACT

Wireless Blue Tooth® headphone controller comprises a game controller having a pair of wireless Blue Tooth® headphones removably stored within the game controller housing and a detachable pair of Blue Tooth® headphones in a separate case capable of being in electrical communication with the game controller.

20 Claims, 6 Drawing Sheets

WIRELESS HEADPHONE CONTROLLER

RELATED APPLICATIONS

The present invention is a continuation of U.S. Provisional Application No. 63/003,396 filed on Apr. 1, 2020, the entire disclosures of which are incorporated herein by reference.

FIELD OF THE INVENTION

The present invention relates generally to the field of headphone controllers and more specifically to the field of wireless headphone controllers.

BACKGROUND OF THE INVENTION

Home video game systems are more popular than ever. Modern technological advancements in gaming systems have resulted in literally hundreds of games with unprecedented depth and detail. It is in the not-too-distant future that one could envision the home video game system as a standard item in almost every American home in much the same manner as a television or computer is. As these numbers continue to increase, the market for gaming accessories is growing as well.

Unfortunately, many of these items such as hand-held controllers, headphones, microphones, mice, keyboards, external drives and the like are connected to the console by cables. This presents a cluttered environment in one's home and even more clutter should the console be transported to a common location for gaming parties with friends. The market has responded with some wireless components, but each item then must be recharged separately which may reduce cables but adds to the confusion. Accordingly, there exists a need for a means by which wireless components of a gaming console such as the hand-held controller and wireless earphones can be integrated to address the problems as described above. The development of the game controller with enhanced features fulfills this need.

SUMMARY OF THE INVENTION

To achieve the above and other objectives, the present invention provides for a game controller has a game controller enclosure which in turn has a main power button, a pair of magnetic holding/charging cavities, an audio power button, a volume increase button, a volume decrease button, a pair of joysticks, a pair of game control pads, and a plurality of associated controls. The game controller also has a pair of removable and customizable hand grips which are coupled to the game controller enclosure along a removal travel path, a plurality of rear game control switches having alternate control while a game is played, a removable rechargeable battery which is disposed on a rear portion of the game controller enclosure, a magnetic electrical connection port which is disposed above the removable rechargeable battery disposed on a rear portion of the game controller enclosure, and a magnetic gaming hub for charging of the removable rechargeable battery to be removed from the game controller enclosure and recharged in one of a plurality of battery charging slots.

The game controller enclosure may charge and connect to an integrated wireless Bluetooth® earphones. The integrated wireless Bluetooth® earphones are stored in a removable tray located in between the pair of hand grips. The game controller also may have an earphone charging base connected to an AC power source by a power adapter and a power cord to charge the integrated wireless Bluetooth® and a pair of magnetic holding/charging cavities which are located within the earphone charging base to allow for charging of the wireless Bluetooth® earphones when not in use to allow for charging the wireless Bluetooth® earphones when not in a close physical location to the game controller. The pair of magnetic holding/charging cavities may allow use of the wireless Bluetooth® earphones with a plurality of portable electronic devices. The magnetic electrical connection port may allow for multiple uses of the wireless Bluetooth® earphones and thus eliminates the unnecessary cost associated with obtaining dedicated wireless Bluetooth® earphones for each of the portable electronic devices.

The tray may include an electrical connector to accommodate a plurality of electrical signals for power, control, volume, and pairing. The pair of joysticks and a plurality of portions of the two game control pads may be visible. The removable rechargeable battery may be removed by pressing a battery release. The removable rechargeable battery may slide in and out and may snap into place. A second removable rechargeable battery may be utilized while the removable rechargeable battery is charging to allow for continuous wireless operation of the game controller.

The magnetic electrical connection port may be used with a connecting cable to charge the game controller while in use. The magnetic electrical connection port may allow for a quick release, resulting in no damage to the connecting cable or the magnetic electrical connection port when the connecting cable be subject to mechanical shock. The magnetic electrical connection port may provide communication during one or more wired connection sessions with the main gaming console. The magnetic electrical connection port may be physically held in place by a plurality of magnets to allow for electrical connection of a plurality of internal electrical contacts.

The game controller may further comprise eight additional magnetic charging ports available for charging of the game controller via the magnetic electrical connection port and an additional connecting cable mating with a magnetic adapter for charging one or more items without a magnetic charging port. The magnetic adapter may convert a plurality of magnetic properties from the second charging cable connector to be adapted to a standard technology selected from the group consisting of a lightning connector, a micro-USB connector, a mini-USB connector, or a USB-C adapter. The magnetic gaming hub may be connected to an AC power source by a power adapter and a power cord.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

10 game controller
15 game controller enclosure
20 wireless Bluetooth® earphone
25 main power button
30 magnetic holding/charging cavity
35 audio power button
40 volume increase button
45 volume decrease button
50 joystick
55 game control pad
60 hand grip
65 removal travel path "h"
70 tray
75 electrical connector
80 rear game control switch
85 battery
90 battery release
95 magnetic electrical connection port
100 earphone charging base
105 AC power source
110 power adapter
115 power cord
120 magnetic gaming hub
125 battery charging slot
130 magnetic charging port
135 charging cable
140 first charging cable connector
145 second charging cable connector
150 magnetic adapter
155 power supply
160 main controller circuit
165 Bluetooth® transceiver
170 Bluetooth® RF signals
175 Bluetooth®-operated device

1. DESCRIPTION OF THE INVENTION

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. DETAILED DESCRIPTION OF THE FIGURES

Figure 1:
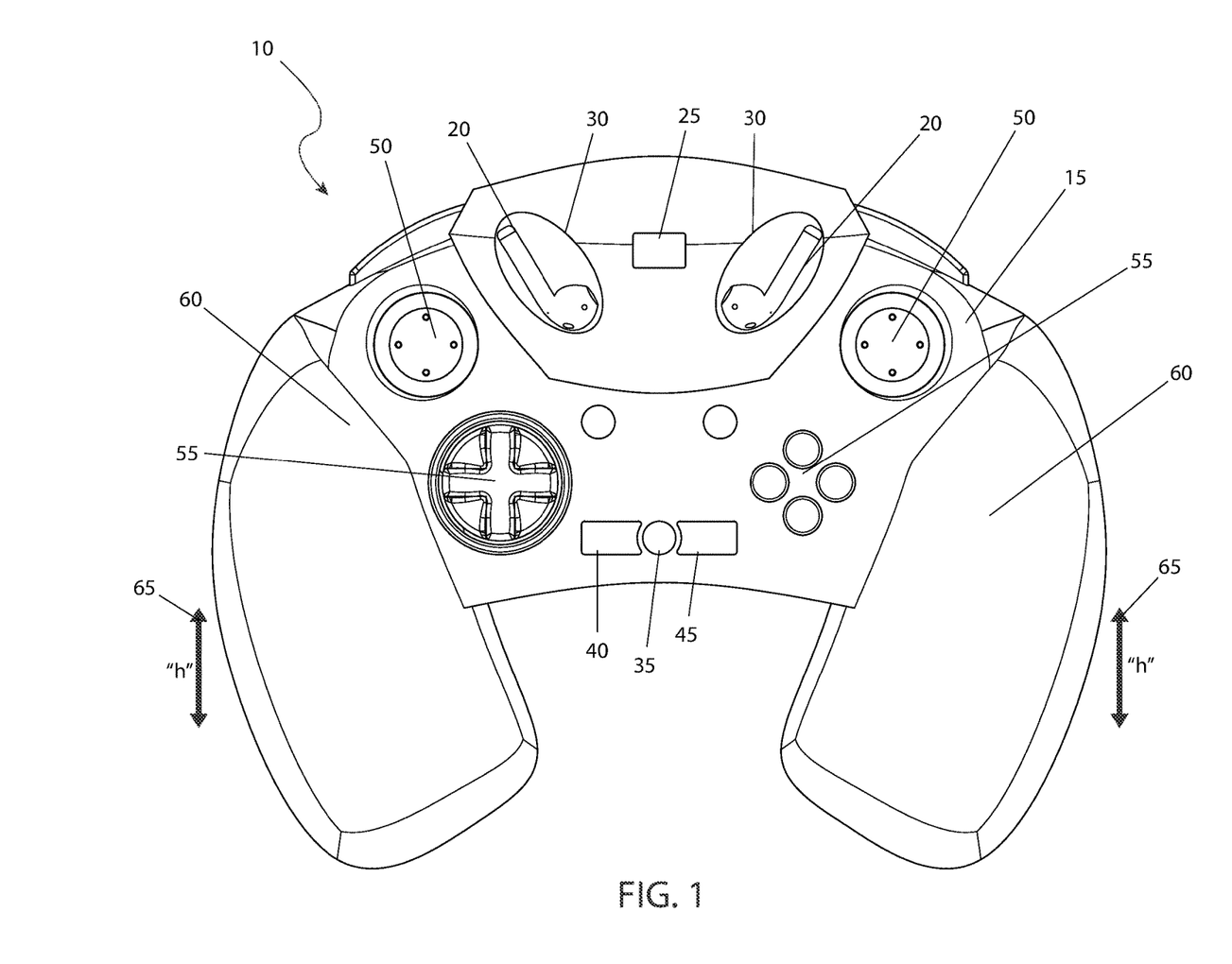
FIG. 1 is a top view of the game controller, according to the preferred embodiment of the present invention.

Referring now to FIG. 1, a top view of the game controller 10, according to the preferred embodiment of the present invention is disclosed. The game controller 10 (herein also described as the "device") 10, includes a game controller enclosure 15 with provisions for charging and connecting to integrated wireless Bluetooth® earphones 20. The game controller enclosure 15 includes a main power button 25, two (2) magnetic holding/charging cavities 30, an audio power button 35, a volume increase button 40, a volume decrease button 45, two (2) joysticks 50, two (2) game control pads, and associated controls. It is noted that the type, quantity, and configuration of game control means is not intended to be a limiting factor of the present invention. The device 10 is also provided with two (2) removable and customizable hand grips 60. The hand grips 60 would be interchangeable via friction fit along a removal travel path "h" 65 and would allow for different sizes, styles, colors and configurations of removal travel path "h" 65 depending on user preferences, hand sizes, and the like.

Figure 2:
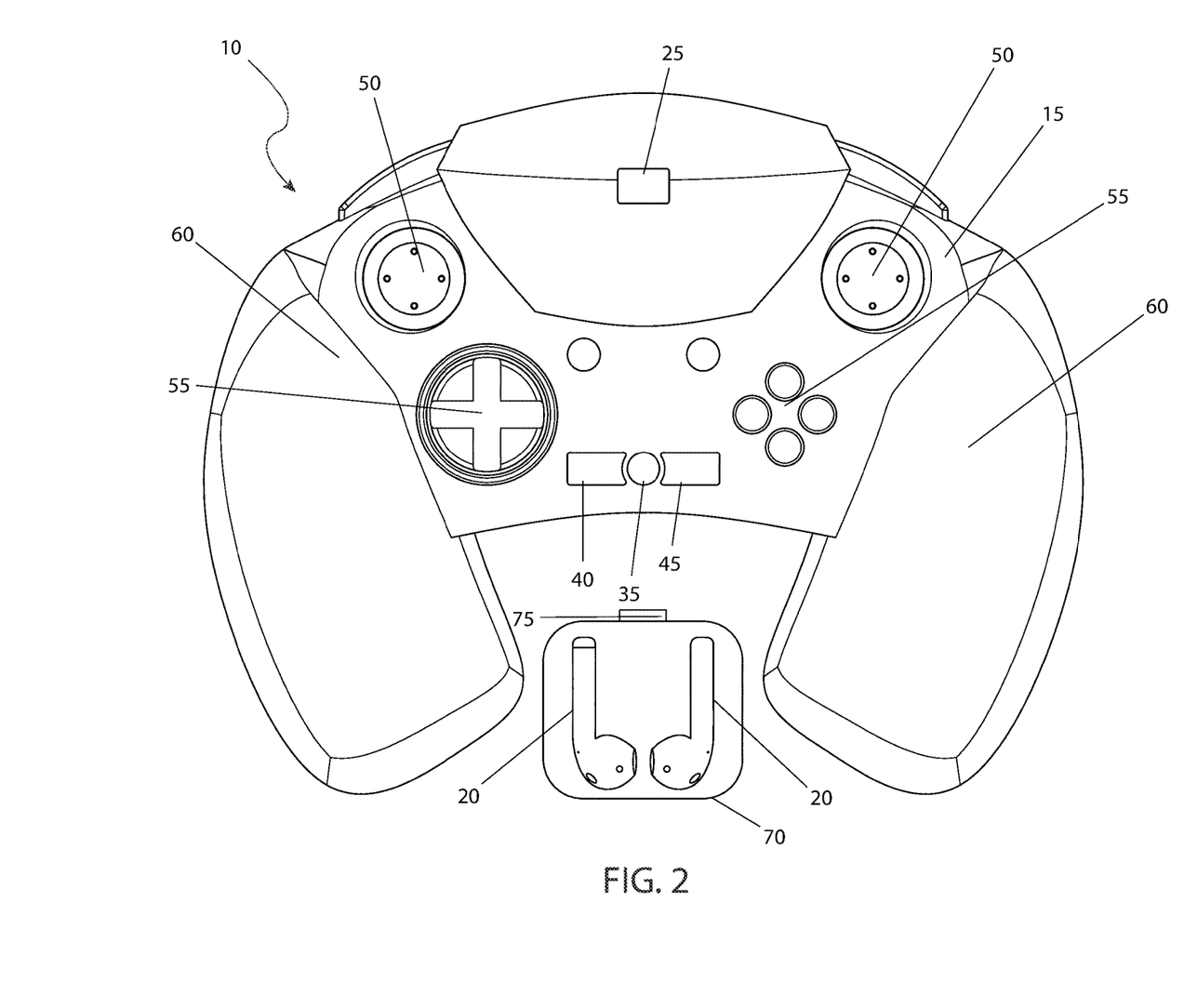
FIG. 2 is a top view of the game controller, according to an alternate embodiment of the present invention.

Referring next to FIG. 2, a top view of the device 10, according to an alternate embodiment of the present invention is depicted. As described in FIG. 1, the alternate embodiment includes a main power button 25, an audio power button 35, a volume increase button 40, a volume decrease button 45, two (2) joysticks 50, two (2) game control pads, and associated controls along with two (2) hand grips 60. However in lieu of two (2) wireless Bluetooth® earphones 20 positioned in the two (2) magnetic holding/charging cavities 30 (as shown in FIG. 1), the two (2) wireless Bluetooth® earphones 20 are provided in a removable tray 70 located in between the two (2) hand grips 60. The tray 70 is provided with an electrical connector 75 to accommodate electrical signals for power, control, volume, pairing, and the like.

Figure 3:
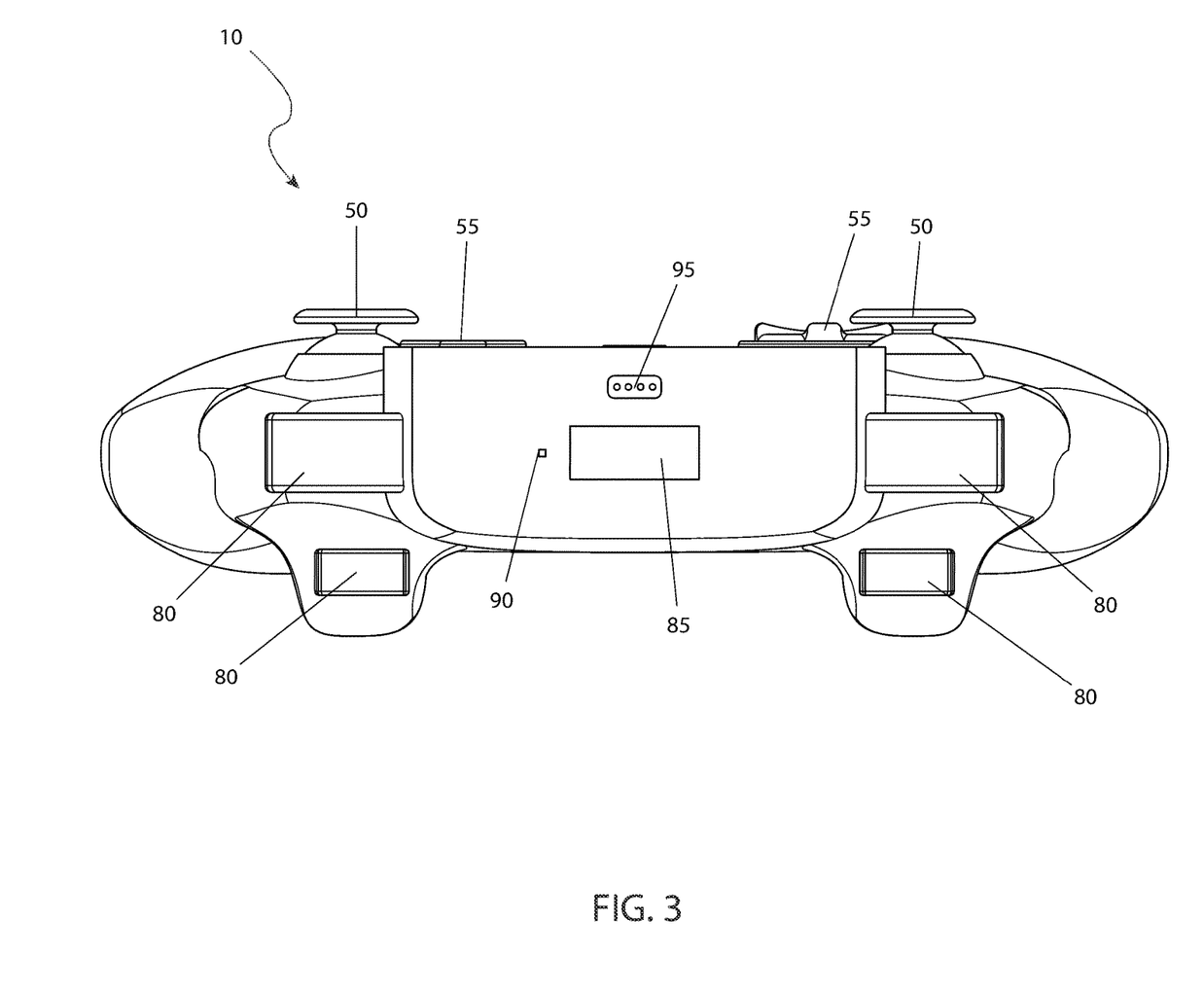
FIG. 3 is a rear view of the game controller, according to the preferred embodiment of the present invention.

Referring now to FIG. 3, a rear view of the device 10, according to the preferred embodiment of the present invention is shown. The two (2) joysticks 50 as well as portions of the two (2) game control pads 55 remain visible. The rear view also discloses four (4) rear game control switches 80 that provide for alternate control during game play. A removable rechargeable battery 85 is visible on the rear of the game controller enclosure 15. Removal of the battery 85 by pressing a battery release 90. It is envisioned that the battery 85 slides in and out and snaps into place similar to other batteries used on portable electronic devices. Located above the battery 85 is a magnetic electrical connection port 95. The magnetic electrical connection port 95 would be used with a connecting cable to charge the device 10 either while in use or not in use. The magnetic electrical connection port 95 would also provide communication abilities during wired connection sessions with the main gaming console. The magnetic electrical connection port 95 is physically held in place by magnets to allow for electrical connection of internal electrical contacts. Should the connecting cable (not shown) be subject to mechanical shock such as receiving a physical impact, reaching end of cord travel, or the like, the magnetic electrical connection port 95 allows for a quick release, thereby resulting in no damage to the connecting cable or the magnetic electrical connection port 95.

Figure 4:
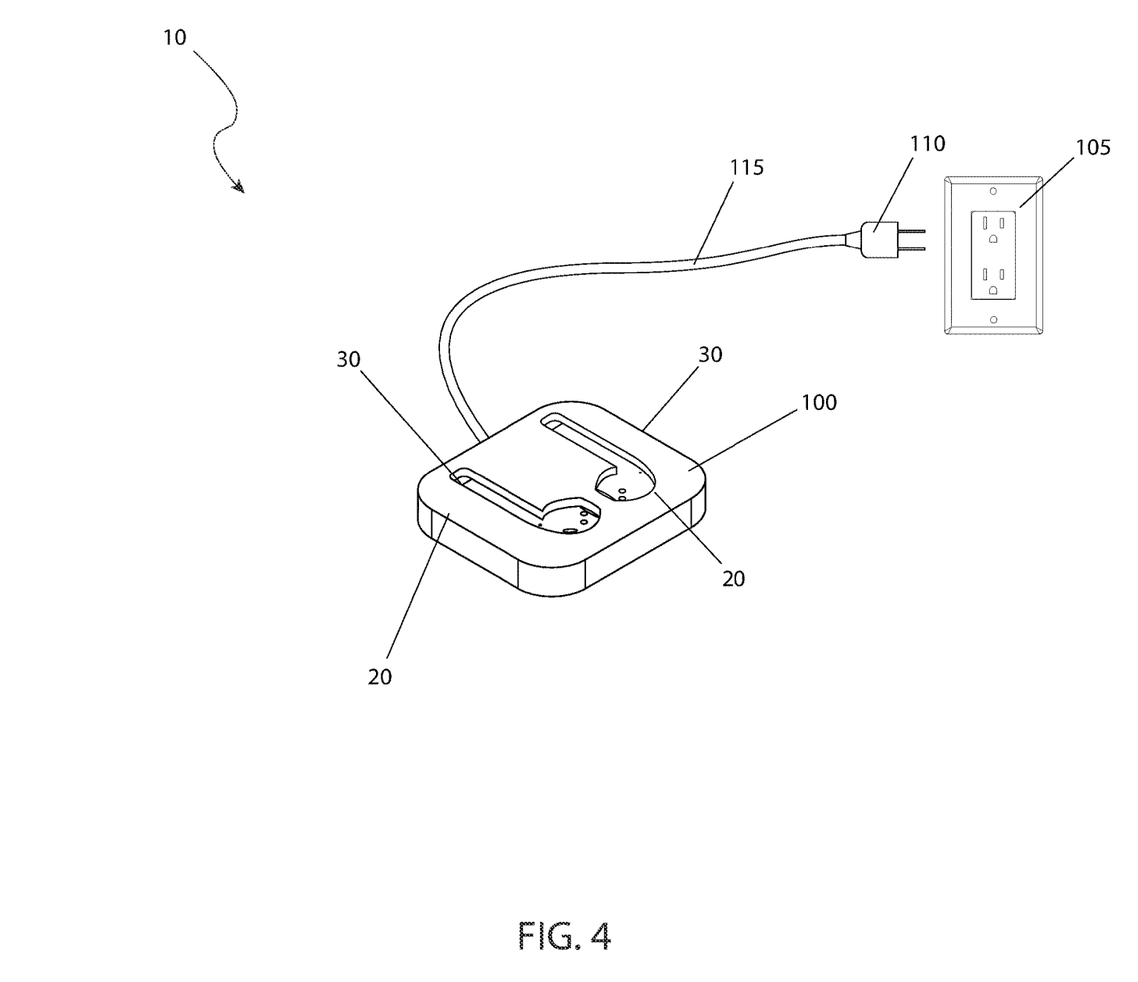
FIG. 4 is a perspective view of the earphone charging base, as used with the game controller, according to the preferred embodiment of the present invention.

Referring next to FIG. 4, a perspective view of the earphone charging base 100, as used with the device 10, according to the preferred embodiment of the present invention is disclosed. The earphone charging base 100 is connected to an AC power source 105 by a power adapter 110 and a power cord 115. Two (2) magnetic holding/charging cavities 30 located within the earphone charging base 100 allow for charging of the wireless Bluetooth® earphones 20 when not in use. This arrangement allows for charging of the wireless Bluetooth® earphones 20 when not in a close physical location to the device 10 (as shown in FIG. 1) or the tray 70 (as shown in FIG. 2). Such an arrangement allows use of the wireless Bluetooth® earphones 20 with other portable electronic devices such as a cellular phone, a portable media player, or the like. This allows for multiple uses of the wireless Bluetooth® earphones 20 and thus eliminates the unnecessary cost associated with obtaining dedicated wireless Bluetooth® earphones 20 for each specific type of portable electronic device.

Figure 5:
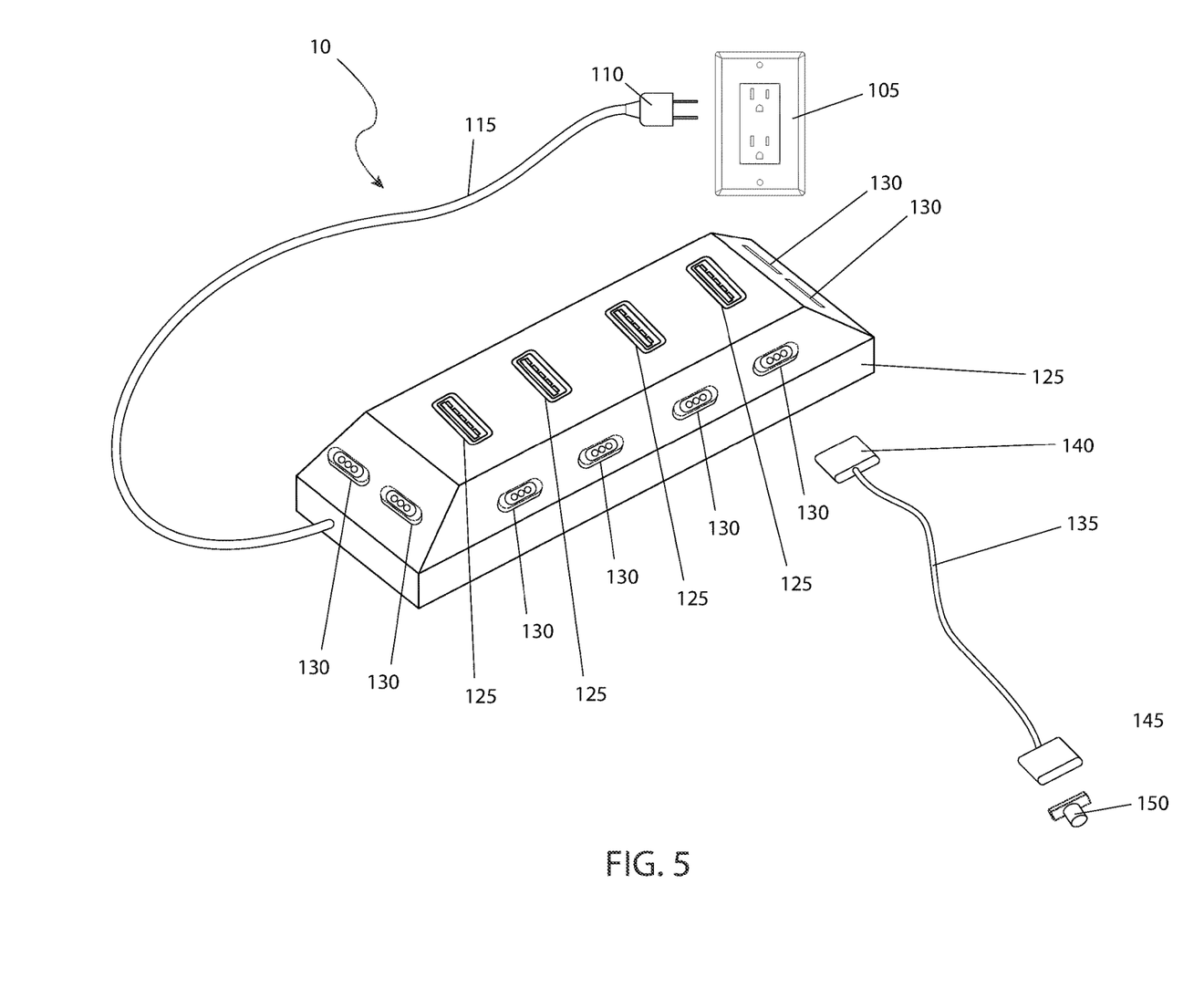
FIG. 5 is a perspective view of the magnetic gaming hub, as used with the game controller, according to the preferred embodiment of the present invention.

Referring now to FIG. 5, a perspective view of the magnetic gaming hub 120, as used with the device 10, according to the preferred embodiment of the present invention is depicted. The magnetic gaming hub 120 provides for charging of the battery 85 (as shown in FIG. 3) to be removed from the game controller enclosure 15 (as shown in FIG. 1) and recharged in one (1) of four (4) battery charging slots 125. As such, a user may utilize one (1) battery 85 while charging one (1) or more other batteries 85 to thus allow for continuous wireless operation of the device 10 (as shown in FIG. 1). Additionally, eight (8) magnetic charging ports 130 are also available for charging of the device 10 via the magnetic electrical connection port 95 (as shown in in FIG. 3) or for any other personal electronic device such as a cellular phone, a personal music player, a camera, a flashlight, a battery pack, or the like. This charging would utilize a charging cable 135 having a first charging cable connector 140 that connects to the magnetic charging ports 130 and a second charging cable connector 145 that mates with a magnetic adapter 150 for charging of items without a magnetic charging port 130. The magnetic adapter 150 provides for conversion of the magnetic properties of the second charging cable connector 145 to be adapted to standard technologies such as Lightning® connectors, micro-USB connectors, mini-USB connectors, USB-C adapters, and the like. As with the case of the earphone charging base 100 (as shown in FIG. 4), the magnetic gaming hub 120 is connected to an AC power source 105 by a power adapter 110 and a power cord 115.

Figure 6:
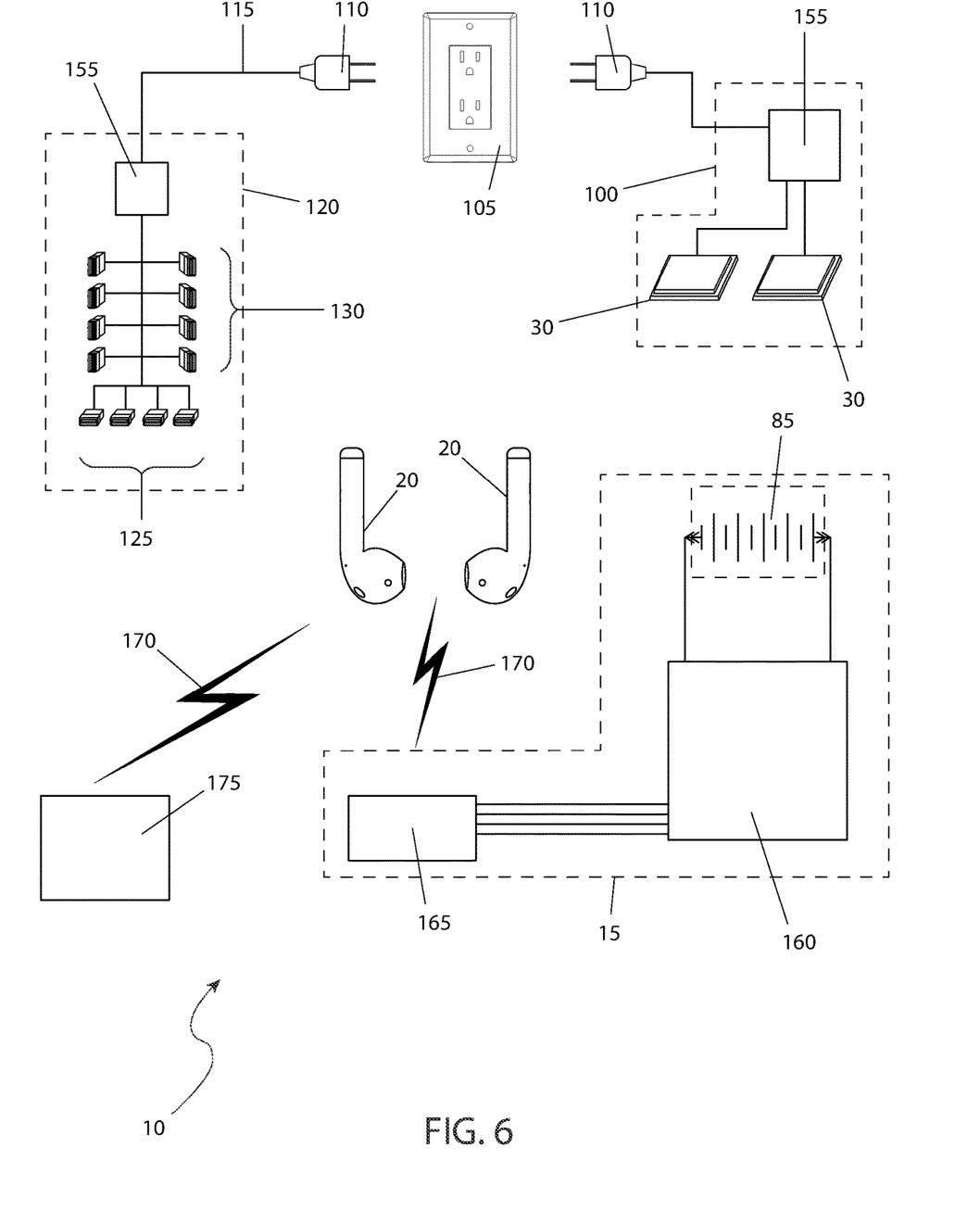
FIG. 6 is an electrical block diagram of the game controller, according to the preferred embodiment of the present invention.

Referring to FIG. 6, an electrical block diagram of the device features 10, according to the preferred embodiment of the present invention is shown. Power for the device 10 is provided by an AC power source 105 and routed to either the earphone charging base 100 or the magnetic gaming hub 120 via the corresponding power adapter 110 and power cord 115. The electrical power is then routed into a power supply 155 in both the earphone charging base 100 and the magnetic gaming hub 120. When utilizing the earphone charging base 100, electrical power is routed through the power supply 155 and into both (2) magnetic holding/charging cavities 30 whereupon charging of the wireless Bluetooth® earphones 20 occurs. When utilizing the magnetic gaming hub 120, electrical power from the power supply 155 is routed into the eight (8) magnetic charging ports 130 and the four (4) battery charging slots 125, whereupon the battery 85 is charged. When the battery 85 is installed in the game controller enclosure 15, it provides power to the main controller circuit 160 which takes the inputs from the main power button 25, the audio power button 35, the volume increase button 40, the volume decrease button 45, the joysticks 50, and the game control pads 55 (all of which are shown in FIG. 1 and FIG. 2). It is noted that the capabilities, design, and interface of the main controller circuit 160 is well known in the art and not within the claims of the present invention. The main controller circuit 160 also interfaces with a Bluetooth® transceiver 165 for passing of audio signals into and out of the main controller circuit 160. The audio signals are transmitted to and from the wireless Bluetooth® earphones 20 via Bluetooth® RF signals 170. The Bluetooth® RF signals 170 may also interface with a Bluetooth®-operated device 175 such as a cellular phone, a personal media player or the like for increased functionality.

3. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 6. The user would procure the device 10 from conventional procurement channels such as electronic stores, discount stores, department stores, mail order and internet supply houses and the like. Special attention would be paid to the choice of the preferred embodiment of FIG. 1, the alternate embodiment of FIG. 2, as well as the size and style of hand grips 60.

After procurement and prior to utilization, the device 10 would be prepared in the following manner: power would then be activated by pressing of the main power button 25 and holding for a period of time, such as three seconds (3 sec.), to pair the device 10 with the gaming controller; holding the main power button 25 until an illumination source inside the main power button 25 begins to flash; removing the wireless Bluetooth® earphones 20 from the magnetic holding/charging cavities 30 or the tray 70 and inserted into the user's ears; energizing the wireless Bluetooth® earphones 20 by pressing the audio power button 35; and, automatically pairing the wireless Bluetooth® earphones 20 with the device 10 unless they are removed and paired with a different device. In the instance when a re-pairing is necessary, the user would hold the audio power button 35 until an internal light inside of the audio power button 35 begins to flash, thereby indicating the device 10 is in pairing mode; adjust the volume control using the volume increase button 40 and volume decrease button 45 as needed. At this point in time, the device 10 is ready for utilization.

During utilization of the device 10, the following procedure would be initiated: the various controls on the device 10 such as the joysticks 50, the game control pads 55, the rear game control switches 80 and the like would be utilized to control game play in a conventional manner.

After use of the device 10, it is de-energized by pressing the main power button 25. The battery 85 may be charged as this point by either removing it from the device 10 and charging it in the battery charging slots 125 of the magnetic gaming hub 120 or by connecting a charging cable 135 between the magnetic charging ports 130 on the magnetic gaming hub 120 and the magnetic electrical connection port 95 of the device 10.

The features of the device 10 provide for a lighter, smarter, faster product with a small footprint for ease of use. It also makes travel with the device 10 easier by eliminating the need to drag along large headsets and various interconnecting cables.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A game controller, comprising:
a game controller enclosure having a main power button, a pair of magnetic holding/charging cavities, an audio power button, a volume increase button, a volume decrease button, a pair of joysticks, a pair of game control pads, and a plurality of associated controls;
a pair of removable and customizable hand grips coupled to the game controller enclosure along a removal travel path;
a plurality of rear game control switches having alternate control while a game is played;
a removable rechargeable battery disposed on a rear portion of the game controller enclosure;
a magnetic electrical connection port disposed above the removable rechargeable battery disposed on a rear portion of the game controller enclosure; and
a magnetic gaming hub charging of the removable rechargeable battery to be removed from the game controller enclosure and recharged in one of a plurality of battery charging slots.

2. The game controller, according to claim 1, wherein the game controller enclosure charges and connects to integrated wireless Bluetooth® earphones.

3. The game controller, according to claim 2, wherein the integrated wireless Bluetooth® earphones are stored in a removable tray located in between the pair of hand grips.

4. The game controller, according to claim 1, further comprising an earphone charging base connected to an AC power source by a power adapter and a power cord to charge integrated wireless Bluetooth® earphones.

5. The game controller, according to claim 1, further comprising a pair of magnetic holding/charging cavities located within the earphone charging base to allow for charging of wireless Bluetooth® earphones when not in use to allow for charging the wireless Bluetooth® earphones.

6. The game controller, according to claim 5, wherein the pair of magnetic holding/charging cavities allows use of the wireless Bluetooth® earphones with a plurality of portable electronic devices.

7. The game controller, according to claim 6, wherein the magnetic electrical connection port allows for multiple uses of the wireless Bluetooth® earphones and thus eliminates the unnecessary cost associated with obtaining dedicated wireless Bluetooth® earphones for each of the portable electronic devices.

8. The game controller, according to claim 1, wherein a tray includes an electrical connector to accommodate a plurality of electrical signals for power, control, volume, and pairing.

9. The game controller, according to claim 1, wherein the pair of joysticks and a plurality of portions of the two game control pads are visible.

10. The game controller, according to claim 1, wherein the removable rechargeable battery is removed by pressing a battery release.

11. The game controller, according to claim 1, wherein the removable rechargeable battery slides in and out and secures into place.

12. The game controller, according to claim 1, wherein a second removable rechargeable battery is utilized while the removable rechargeable battery is charging to allow for continuous wireless operation of the game controller.

13. The game controller, according to claim 1, wherein the magnetic electrical connection port is used with a connecting cable to charge the game controller while in use.

14. The game controller, according to claim 13, wherein the magnetic electrical connection port allows for a quick release, resulting in no damage to the connecting cable or the magnetic electrical connection port when the connecting cable is subject to mechanical shock.

15. The game controller, according to claim 1, wherein the magnetic electrical connection port provides communication during one or more wired connection sessions with a main gaming console.

16. The game controller, according to claim 1, wherein the magnetic electrical connection port is physically held in place by a plurality of magnets to allow for electrical connection of a plurality of internal electrical contacts.

17. The game controller, according to claim 1, further comprising eight additional magnetic charging ports available for charging of the game controller via the magnetic electrical connection port.

18. The game controller, according to claim 1, further comprising an additional connecting cable mating with a magnetic adapter for charging one or more items without a magnetic charging port.

19. The game controller, according to claim 18, wherein the magnetic adapter converts a plurality of magnetic properties from the second charging cable connector to be adapted to a standard technology selected from the group consisting of a lightning connector, a micro-USB connector, a mini-USB connector, or a USB-C adapter.

20. The game controller, according to claim 1, wherein the magnetic gaming hub is connected to an AC power source by a power adapter and a power cord.

* * * * *